UNITED STATES PATENT OFFICE.

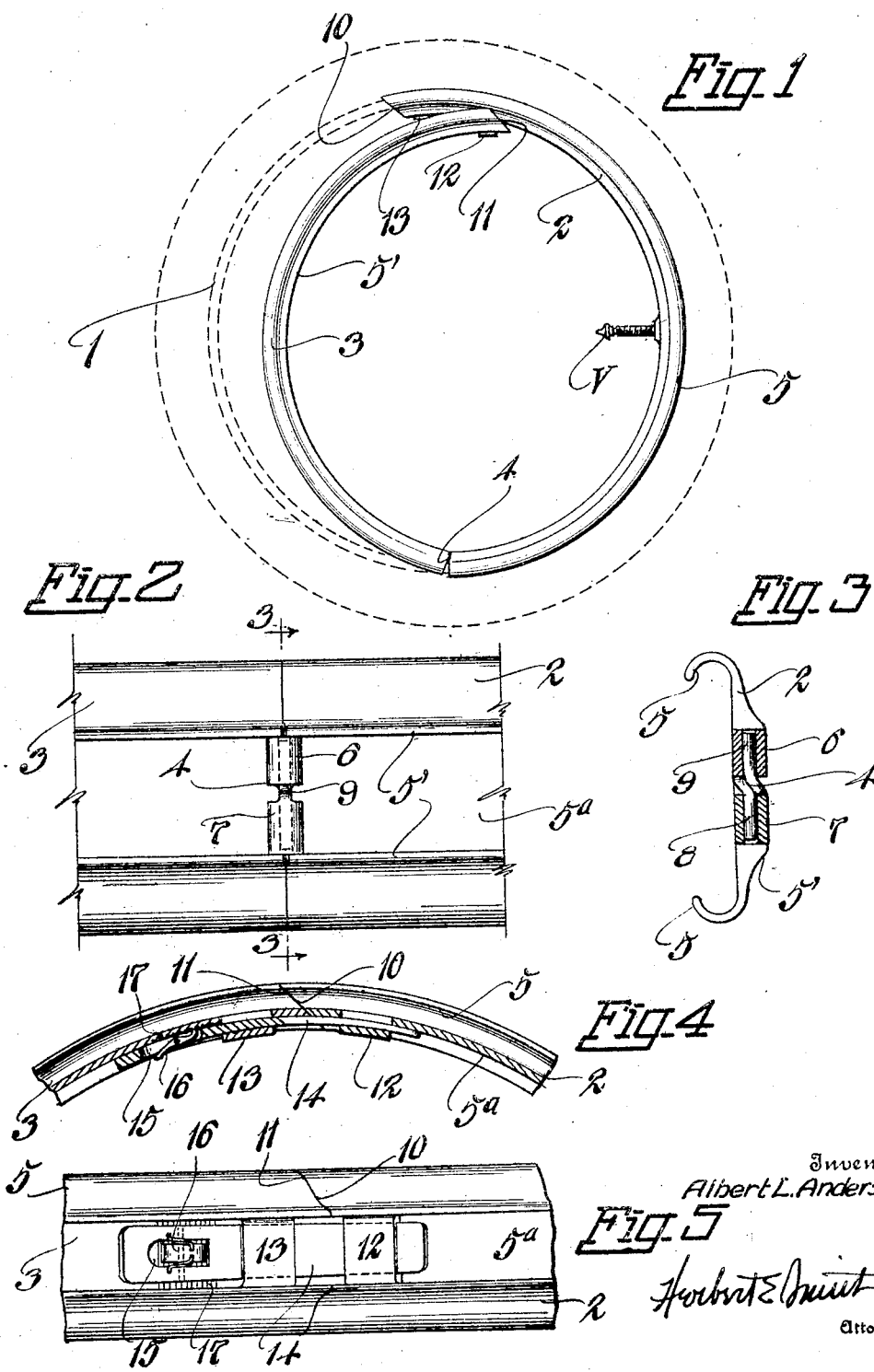

ALBERT L. ANDERSON, OF SPOKANE, WASHINGTON, ASSIGNOR OF ONE-FOURTH TO JAMES F. MAZNA AND ONE-FOURTH TO GEORGE B. SHAFER, BOTH OF SPOKANE, WASHINGTON.

DEMOUNTABLE RIM.

1,353,943.

Specification of Letters Patent. Patented Sept. 28, 1920.

Application filed March 24, 1920. Serial No. 368,279.

*To all whom it may concern:*

Be it known that I, ALBERT L. ANDERSON, a citizen of the United States, residing at Spokane, in Spokane county and State of Washington, have invented certain new and useful Improvements in Demountable Rims, of which the following is a specification.

My present invention relates to improvements in demountable rims for automobile wheels and tires, and is designed especially for the purpose of providing a rim of this character which may be applied to or loosened and withdrawn from the wheel tire with facility, and which also permits the rim to be applied to the felly or other part of the wheel with convenience, and without the necessity of skilled assistance. To this end the invention contemplates a construction involving a novel form of hinge joint between the long and shorter section of the demountable rim, together with other improved features of construction and combinations and arrangements of parts as will be hereinafter more fully described and claimed.

In the accompanying drawings I have illustrated one complete example of the physical embodiment of my invention in which the parts are combined and arranged according to the best mode I have thus far devised for the practical application of the principles of my invention, and while a full disclosure is illustrated, it will be understood that colorable changes and alterations may be made in the structure without departing from the spirit of my invention and scope of my appended claims.

Figure 1 is a view showing in full lines the demountable, sectional, hinged rim, detached, as to one portion, from the tire that is shown by dotted lines.

Fig. 2 is an enlarged, detail, plan view at the hinge joint between the sections of the rim.

Fig. 3 is a transverse sectional view at the hinge joint on line 3—3 of Fig. 2.

Fig. 4 is a central longitudinal view at the fastened joint of the free ends of the rim sections.

Fig. 5 is a plan view showing the fastened ends of the joint of Fig. 4.

To illustrate the relation of parts I have indicated a conventional automobile wheel tire by dotted lines 1, to which the demountable rim is attached. The rim is made up of two hinged sections, the longer one being designated 2 and the shorter one as 3, the latter adapted to be withdrawn from the inner periphery of the tire, as indicated in Fig. 1. The long and short sections are hinged together at the joint 4, and each section is provided with lateral flanges 5 to form the circumferential members for engagement with the beads at the side walls of the tire as usual. Spaced equidistant from the inner peripheral center of the complete rim are arranged a pair of parallel circumferential ribs 5' forming between them an annular groove 5ª central of the rim and designed to co-act with the wheel felly or other part of the wheel (not shown) in mounting the rim and tire. Provision is made for the inflation of the inner tube of the pneumatic tire by the valve device V shown attached to the long section 2 in Fig. 1.

One of the meritorious and essential features of the device resides in the hinge joint designated as a whole by the numeral 4, and it will be noted in the drawings that a pair of alined, transverse sleeves 6 and 7, overlap the hinge joint and extend between the two ribs 5' as in Fig. 2. These alined sleeves or socket members are adapted to receive the two hinge pins 8 and 9, formed integral, each with a sleeve, offset at their bases, but alined with relation to the sleeves to form hinge or pivot joints for the two sections 2 and 3 of the rim. The sleeves, as seen in Fig. 3 are flush with the faces of the circumferential ribs 5' and therefore do not obtrude from the rim surface in engagement with the wheel felly, thus providing a convenient and workmanlike construction enabling the manipulation of the wheel parts with facility and rapidity in demounting the rim or in attaching it in place.

The free ends of the rim sections are provided with complementary beveled edges 10 and 11 that overlap as in Fig. 4 permitting the section 3 to be readily withdrawn, as in Fig. 1, from the longer section, and with equal convenience permitting the closure of the short section into place.

To provide locking means for the free ends of the sections I employ a pair of loops 12 and 13, the former a keeper and the latter a guide or bearing loop for the slide latch 14. These loops are integral with their respective rim sections and are stamped out or struck up therefrom and located in the inner circumferential center of the rim between the ribs 5' as disclosed in Fig. 5.

The operation of the slide latch or metal plate 14 will be obvious, and in order that the latch may be locked in position to secure the free ends of the sections, said latch is provided with a central slot 15 near its rear end, and a spring pawl 16 is pivoted in the walls of the slot and carried by the latch, the operating end of the pawl being designed to engage one of the teeth or corrugations 17 provided therefor on the face of the section 2. Thus it will be apparent that after the overlapping ends of the sections have been brought to proper position, the latch carried by the section 2 may have its forward end slipped through the loop 12 as shown in Fig. 5, and the pawl 16, which is held out of engagement while the latch is being slipped home, is released to engage the teeth 17, to lock the latch against movement, and rigidly hold the two free ends of the sections in place.

From the above description taken in connection with drawings it is obvious that I have provided an improved and novel form of demountable rim which fulfils the objects and purposes set forth and performs its functions in a comparatively perfect manner.

Having thus fully described my invention, what I claim as new and desire to secure by Letters Patent is—

1. The combination in a demountable rim of a long and a shorter hinged section each fashioned with a transverse integral hinge sleeve, and each sleeve formed with an offset hinge pin, said offset pins each projecting into the complementary opposed hinge sleeve to form alined pivot members.

2. The combination with a pair of demountable rim sections of a transversely disposed, centrally offset sleeve on each adjoining end of the sections and overlapping the hinge joint, an offset pin projecting from the outer wall of one sleeve into the opposite sleeve, and an offset pin projecting from the inner wall of the other sleeve into its opposed sleeve, said pins forming alined pivot members, and means for securing the free ends of the rim sections.

In testimony whereof I hereunto affix my signature.

ALBERT L. ANDERSON.